April 3, 1956  W. D. JEWELL  2,740,299
SUSPENSION FOR GYROSCOPES
Filed May 23, 1952

INVENTOR.
WENDELL D. JEWELL
BY Raymond A. Paquin
ATTORNEY.

United States Patent Office 2,740,299
Patented Apr. 3, 1956

2,740,299

SUSPENSION FOR GYROSCOPES

Wendell D. Jewell, Lynbrook, N. Y., assignor to American Bosch Arma Corporation, a corporation of New York Application May 23, 1952, Serial No. 289,536

15 Claims. (Cl. 74—5)

The present invention relates to gyroscope suspension, and has particular reference to a novel suspension by means of which correcting torques may be applied to a gyro.

The basic operation of a gyro compass employing resilient mechanical connections between the gyro casing and its follow up members to cause precession of the gyro upon offsetting of the follow up members from the gyro is fully explained in the copending application, Serial No. 128,366, filed November 19, 1949 for "Gyroscopic Compass" by Ronald L. Bishop. The present invention is an improvement over the means shown in the copending application for the mechanical torsion wire connections between the gyroscope and the follow up member. In each invention the weight of the gyroscope is supported by immersing the gyroscope casing in neutral flotation in a liquid contained in a tank, which is the follow up member.

The present invention is particularly suited for stable verticals of the type suggested by the copending application previously referred to, and will be described for that particular embodiment, although its use can be advantageously extended to gyro compasses and free gyros with appropriate changes well recognized by those familiar with the art of gyroscopes.

In the preferred embodiment of the invention, a vertical spin axis gyroscope wheel is contained in each of two casings, disposed one above the other, which are adapted to receive the crossed wire suspension between them in a horizontal position. The crossed-wire suspension is composed of four wires extending between the gyro casings and the follow up member. Each of the four wires is bent in the form of the letter L and all are joined by an insulator at the bend of the L in a manner such that the assembly resembles a cross. Two opposite pairs of wires are mechanically connected across a diameter of the follow up member while the remaining two opposite pairs are connected across a diameter of the gyroscope casing.

The wires are preferably electrically insulated from one another to provide four separate paths for the conduction of electrical power to the gyroscope. The present invention also allows elimination of one gimbal ring formerly required thereby resulting in a smaller more economical unit.

For a better understanding of the invention, reference may be had to the accompanying diagrams, in which.

Figure 1:
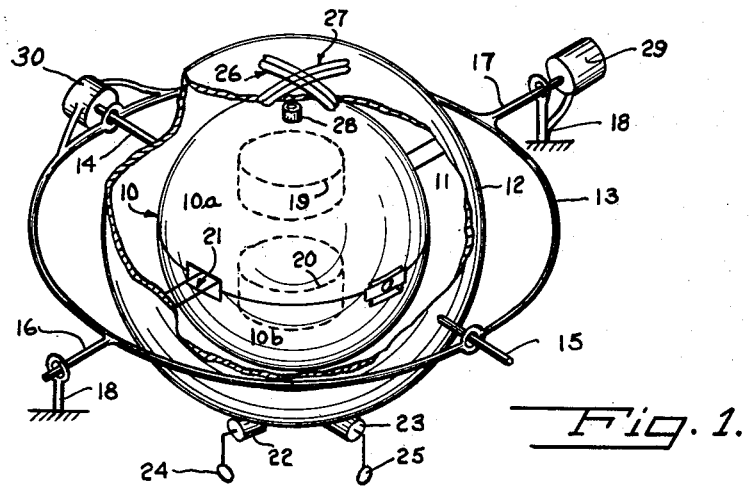
Figure 1 is a schematic diagram of a gyro vertical embodying the present invention.

With reference to Figure 1 of the drawings in which a gyro vertical embodying the present invention is shown, numeral 10 designates a gyro casing composed of two hermetically sealed half spheres 10a and 10b, each containing a vertical spin axis gyro 19 and 20 respectively. The gyro casing 10 is immersed in a fluid 11, contained within a spherical tank or follow up member 12 which is shown partly broken away to reveal the casing 10, which is suspended in approximate neutral flotation therein. The tank 12 is supported in horizontal gimbal ring 13 by the horizontal shafts 14, 15 and the gimbal ring 13 is, in turn, supported by shafts 16, 17 in supports 18 which are secured to the deck of the vehicle in which the stable vertical is carried. Shafts 14, 15 are perpendicular to shafts 16, 17.

The sphere 10 is connected to the tank 12 by means of the wire suspension 21 which comprises the present invention. By means of this suspension 21, the torques for causing the spin axes of the gyros to precess towards the true vertical are applied to the gyros by displacing the follow up member (tank 12) relatively to the gyro casing 10, as will be described.

Sphere 12 carries two pickup devices 22 and 23 which may be of the rotary induction type. Pendulums 24 and 25 are connected to the rotors of the pickup devices 22 and 23, so that the pickups 22 and 23 are responsive to tilts of the tank 12 from the vertical in the vertical planes parallel to the axes through shafts 14, 15 and 16, 17 respectively. The pendulums are damped in order to decrease their sensitivity to oscillations. Tank 12 also carries pickup windings 26, 27 each of which is wound in the form of the numeral 8 and located in the field of influence of an electromagnet 28 which is energized by alternating current and is carried by the casing 10. A displacement of the gyro casing 10 with respect to the tank 12 about the axes through shafts 14, 15 and shafts 16, 17 develops a voltage proportional in magnitude to the amount of displacement and corresponding in phase to the direction of displacement in pickups 26 and 27 respectively. The pickup and magnet device may be of the type disclosed and described in U. S. Patent No. 2,421,247 issued May 27, 1947, for example.

A motor 29 is carried by the support 18 and is connected to drive the gimbal ring 13 about the pivots of shafts 16, 17 while a motor 30, carried by the gimbal ring 13, drives the spherical tank 12 about the pivots of shafts 14 and 15. In operation motor 29 is energized jointly by the pickup winding 27 and the pendulum pickup 23 while motor 30 is energized jointly by the pickup winding 26 and pendulum pickup 22.

Figure 2:
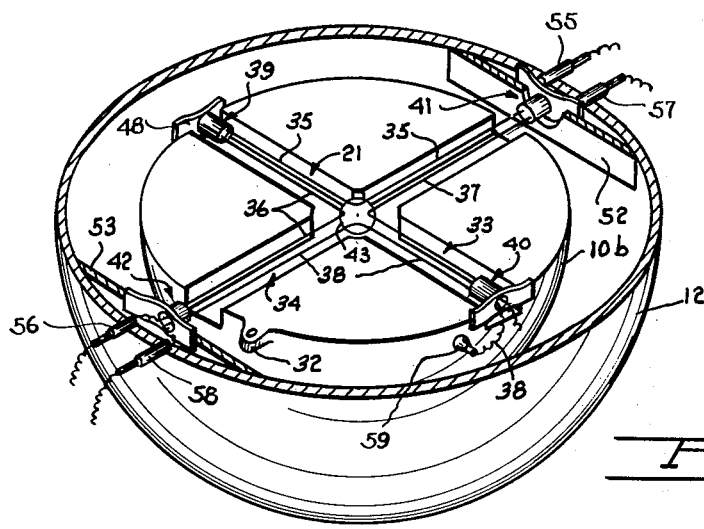
Figure 2 is an isometric representation of the wire suspension showing its connection to the gyro and its follow up member.

With reference now to Figure 2, the tank 12 is shown in section to reveal the gyro casing 10 of which one half 10a has been removed in order to show the suspension 21 more clearly. The two similar half-spheres 10a and 10b are normally secured together by means of dogs 32, for example, of which only one is shown or by any other convenient means.

The half sphere 10b has two orthogonal channels 33, 34 in the flat surface thereof in which the wires 35, 36, 37 and 38 of the wire suspension 21 are located. One end of each of the wires 35, 36 is attached to the sphere 10 by the clamping device 39, and diametrically opposite thereto one end of each of the wires 37 and 38 is attached to the sphere 10 by the clamping device 40. The other ends of wires 35 and 37 are attached to the tank 12 by the clamping device 41, while the other ends of wires 36 and 38 are attached to the tank 12 by the clamping device 42. The wires 35, 36, 37 and 38 are all clamped together near the geometrical center of the spherical shell 10, preferably by being fused into a glass bead connector 43 as seen more clearly in Fig. 3. This glass bead connector is at substantially the spin axis of the gyroscope.

Figure 3:
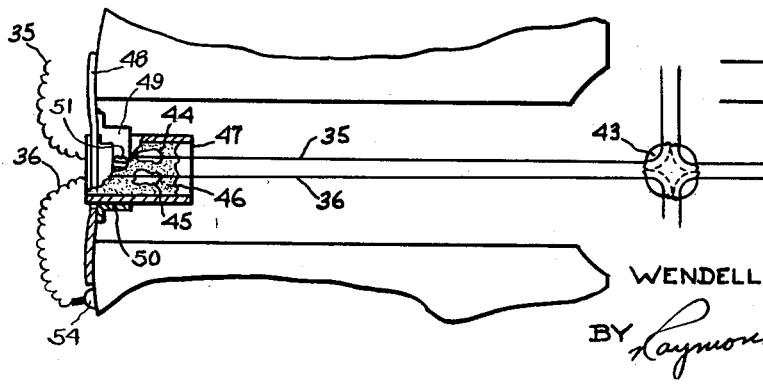
Figure 3 is a detailed sectional view of one of the wire clamping devices.

The glass bead 43 is preferably formed by first fusing a small glass bead about each wire 35, 36, 37 and 38 as indicated by the dotted lines in Fig. 3 and then fusing all four beads into one. This method provides for ease of assembly of the wire suspension 21.

The clamping devices 39, 40, 41 and 42 are all similar, and are all constructed in the manner of Fig. 3, in which a detailed view, partly in section, of the clamping device 39 is shown. Glass beads 44 and 45 are fused about the wires 35 and 36 respectively. The glass beads 44 and 45 are embedded in a cementitious preparation 46 which is contained in the tube 47. The tube 47 is suspended from the sphere 10 by the leaf spring 48, which is permanently fixed to the sphere 10 by means of screws, for example. The tube 47 is preferably adjustable with respect to the spring 48 so that the tension on the wires 35, 36, 37 and 38 can be easily regulated. Thus, the tube 47 is held between the straps 49 and 50 which are fastened to the spring 48. Loosening of the straps 49 and 50 by unscrewing bolt 51 permits movement of the tube 47, whereas subsequent tightening of the straps 49 and 50 by means of bolt 51 holds the tube 47 firmly in place.

The clamping devices 41 and 42 are shown as being suspended from supports 52 and 53 respectively in the tank 12. Other means may be used such as connecting the leaf springs directly to the tank surface if desired, but care must be taken to preserve the tightness of tank 12 to prevent loss of liquid 11.

The leaf springs 48 maintain a predetermined constant tension on the wires 35, 36, 37 and 38 primarily to provide a reasonable force gradient along the gyro axis tending to center the gyro casing 10 within the tank 12.

The operation of the gyro vertical equipped with a wire suspension, such as 21, may be understood from the following simplified description. It must be realized that the erection of the spin axis is not as simple an operation as herein described but is a more complex action. The present invention however concerns itself only with the wire suspension 21 so that the simplified operational description will be sufficient to illustrate its use. A complete description of the operation of a gyro compass which uses a torsion wire suspension is contained in the previously referred to application, Serial No. 128,366, and reference thereto may help in understanding the function of the torsion wires. When the gyro 19, 20 is tilted out of the vertical about an axis through shafts 16, 17 for example, the tank 12 is driven by motor 29 to a position where the output of pickup 27 is zero, or until the position of tank 12 corresponds to the position of gyro 19, 20. The resulting tilt of tank 12 is sensed by the pendulum pickup 22 which energizes motor 30 to drive tank 12 about the axis through shafts 14, 15 thereby displacing tank 12 with respect to the gyro 19, 20 and producing a voltage in pickup windings 26. The voltage of windings 26 opposes that of pendulum pickup 22 and motor 30 therefore drives the tank 12 until the pickup 26 voltage is equal to that of the pendulum pickup 22 output. As a result, the tank 12 is displaced from the gyro casing 10 so that the wires 35 to 38 are twisted about an axis through clamps 39 and 40. The twisted wires 35 through 38 therefore apply a torque to the gyro 19, 20 which is in a direction such as to cause the gyro spin axis to precess towards the vertical about the axis 16—17.

Obviously, a tilt of the tank 12 about the axis 14, 15 displaces the pendulum pickup 23 from its null position to produce a voltage which energizes follow up motor 29. Tank 12 is therefore displaced from the gyro 19, 20 to twist the wires 35, 36, 37 and 38 about the axis through clamps 41, 42 and thereby causes the gyro spin axis to precess away from the verticals about the axis through shafts 14—15.

It will be seen that with suitable damping of the pendulums 24, 25 the gyro spin axis will erect into the vertical along a spiral path. Correcting torques for predictable errors such as earth's rotation and ship's motion are applied by energizing the motors 29 and 30 with properly scaled corresponding voltages jointly with the pickup voltages from windings 26, 27 to cause displacement of the tank 12 from the gyro 10 and thereby twist the wires 35, 36, 37 and 38 to apply the torques to the gyro 19, 20. The gyro spin axis will settle in a position displaced slightly from the vertical by a small but known angle. A correction can be applied to the gyro position to correctly indicate the true vertical.

The wires 35, 36, 37 and 38 are preferably made of a good electrical conductor and may be advantageously used to transmit electrical power to the gyroscope motors and pickup magnet 28. One end of wire 36 emerges through the clamping device 39 and is connected to the insulated leadin 54 to the half-sphere 10b. Similarly the wire 38 is also connected to an insulated leadin, 59 (Fig. 2) on the half-sphere 10b. The wires 35 and 37 are similarly connected to leadins on the other half sphere, not shown.

The outer ends of wires 35, 36, 37 and 38 emerge through the clamping devices 41, 42 and are connected to insulated leadins 55, 56, 57 and 58 respectively which are mounted on tank 12. It will be seen that the wires 35, 36, 37 and 38 are electrically insulated from one another in the clamping devices 39, 40, 41 and 42 and in the glass bead 43, each wire provides a path for electrical power from outside tank 12 to the inside of sphere 10. The gyro motors, not shown, are therefore energized by connecting a source of power to leadins 55 and 57 and to the leadins 56, 58.

The wires 35, 36, 37 and 38 must have reasonably good tensile strength, be good electrical conductors and must have the same thermal expansion properties as glass. Since these requirements are satisfactorily met by tungsten, the wires 35, 36, 37 and 38 are preferably made of that material.

Although the invention has been illustrated by reference to a gyroscopic stable vertical, it is not intended to limit the invention thereby. The stable vertical was chosen as illustrative because the torque gradients about the horizontal axes are equal and the description is relatively simple.

In gyro compasses, however, it is preferable to have the torque gradient about the vertical axis much less than that about the horizontal axis. The wire suspension possessing such properties would require the wires extending vertically to have a cross section and spacing different from those of the horizontally extending wires. In this case the junction of the different wires would, of course, be imbedded in the glass bead 43, preserving the four electrical paths provided by the wires 35, 36, 37 and 38.

I claim:

1. In a gyroscopic apparatus adapted to be mounted on an unstable support, the combination of a gyroscope, a connector member on the spin axis of the gyroscope, a follow up member, elastic elements connected to said connector and to said gyroscope at spaced points and an elastic element connected to said connector and to said follow up member and suspending said gyroscope in said follow up member for movement about an axis, said follow up member being adapted to be mounted on said support for movement about coordinate axes.

2. In a gyroscopic apparatus adapted to be mounted on an unstable support, the combination of a gyroscope, a connector member on the spin axis of said gyroscope, a follow up member, torsion filaments connected to said connector and to said gyroscope at spaced points and a torsion filament connected to said connector and to said follow up member and suspending said gyroscope in said follow up member for movement about an axis, said follow up member being adapted to be mounted on said support for movement about coordinate axes.

3. In a gyroscopic apparatus adapted to be mounted on an unstable support, the combination of a gyroscope, a follow up member, elastic elements connected to said gyroscope and to said follow up member and suspending said gyroscope in said follow up member for movement about an axis, said follow up member being adapted to be mounted on said support for movement about coordinate axes, said elastic elements being connected to a common connector.

4. In a gyroscopic apparatus adapted to be mounted on an unstable support, the combination of a gyroscope, a follow up member, elastic elements connected to said gyroscope and to said follow up member and suspending said gyroscope in said follow up member for movement about coordinate axes, said follow up member being adapted to be mounted on said support for movement about coordinate axes, said elastic elements being connected to a common connector.

5. In a gyroscopic apparatus adapted to be mounted on an unstable support, the combination of a gyroscope, a follow up member, elastic elements connected to said gyroscope and to said follow up member and suspending said gyroscope in said follow up member for movement about perpendicular axes, said follow up member being adapted to be mounted on said support for movement about coordinate axes, said elastic elements being connected to a common connector.

6. In a gyroscopic apparatus adapted to be mounted on an unstable support, the combination of a gyroscope, a follow up member, elastic elements connected to said gyroscope and to said follow up member and suspending said gyroscope in said follow up member for movement about an axis, said follow up member being adapted to be mounted on said support for movement about coordinate axes, said elastic elements being connected to a common connector at substantially the spin axis of said gyroscope.

7. In a gyroscopic apparatus adapted to be mounted on an unstable support, the combination of a gyroscope, a follow up member, elastic elements connected to said gyroscope and to said follow up member and suspending said gyroscope in said follow up member for movement about coordinate axes, said follow up member being adapted to be mounted on said support for movement about coordinate axes, said elastic elements being connected to a common connector at substantially the spin axis of said gyroscope.

8. In a gyroscopic apparatus adapted to be mounted on an unstable support, the combination of a gyroscope, a follow up member, elastic elements connected to said gyroscope and to said follow up member and suspending said gyroscope in said follow up member for movement about perpendicular axes, said follow up member being adapted to be mounted on said support for movement about coordinate axes, said elastic elements being connected to a common connector at substantially the spin axis of said gyroscope.

9. In a gyroscopic apparatus adapted to be mounted on an unstable support, the combination of a gyroscope casing comprising a pair of hermetically sealed sections, a spin axis gyro in each of said sections, a follow up member for said gyroscope casing, an elastic element connected to said gyroscope casing and to said follow up member and suspending said gyroscope in said follow up member for movement about an axis, said follow up member being adapted to be mounted on said support for movement about coordinate axes.

10. In a gyroscopic apparatus adapted to be mounted on an unstable support, the combination of a gyroscope casing comprising a pair of hermetically sealed sections, a spin axis gyro in each of said sections, a follow up member for said gyroscope casing, a plurality of elastic elements connected to said gyroscope casing and to said follow up member and suspending said gyroscope in said follow up member for movement about an axis, said follow up member being adapted to be mounted on said support for movement about coordinate axes.

11. In a gyroscopic apparatus adapted to be mounted on an unstable support, the combination of a gyroscope casing comprising a pair of hermetically sealed sections, a spin axis gyro in each of said sections, a follow up member for said gyroscope casing, a plurality of elastic elements connected to said gyroscope casing and to said follow up member and suspending said gyroscope in said follow up member for movement about an axis, said follow up member being adapted to be mounted on said support for movement about coordinate axes, said elastic elements being connected to a common connector.

12. In a gyroscopic apparatus adapted to be mounted on an unstable support, the combination of a gyroscope casing comprising a pair of hermetically sealed sections, a spin axis gyro in each of said sections, a follow up member for said gyroscope casing, a plurality of elastic elements connected to said gyroscope casing and to said follow up member and suspending said gyroscope in said follow up member for movement about an axis, said follow up member being adapted to be mounted on said support for movement about coordinate axes at substantially the spin axis of said gyroscope.

13. In a gyroscopic apparatus adapted to be mounted on an unstable support, the combination of a gyroscope, a follow-up member, a plurality of elastic elements, one end of said elastic elements being connected to said gyroscope, the other end of said elastic elements being connected to said follow-up member and means for joining said elements at their center.

14. In a gyroscopic apparatus adapted to be mounted on an unstable support, the combination of a gyroscope, a follow-up member, a plurality of elastic elements, each of said elastic elements comprising two electrically conducting torsion filaments, one end of said elements being connected to said gyroscope, the other end of said elements being connected to said follow-up member, said elements being mechanically joined in a common connector, one filament of each of said elements being electrically connected to the other filament of said element.

15. In a gyroscopic apparatus adapted to be mounted on an unstable support, the combination of a gyroscope, a follow-up member, a plurality of elastic elements, each of said elastic elements being connected to said gyroscope and to said follow-up member and means for mechanically connecting each of said elastic elements together at substantially the spin axis of the gyroscope, but leaving said elastic elements electrically separated.

References Cited in the file of this patent

UNITED STATES PATENTS

| Number | Name | Date |
|---|---|---|
| 1,981,687 | Caster | Nov. 20, 1934 |
| 2,209,735 | Lauck | July 30, 1940 |
| 2,311,652 | Esval | Feb. 23, 1943 |
| 2,419,948 | Haskins | May 6, 1947 |
| 2,517,612 | Varian | Aug. 8, 1950 |
| 2,598,672 | Braddon | June 3, 1952 |